United States Patent [19]

Satoh et al.

[11] Patent Number: 5,213,361
[45] Date of Patent: May 25, 1993

[54] AIR BAG

[75] Inventors: Takeshi Satoh; Ryo Kurosaki, both of Echi, Japan

[73] Assignee: Takata Corporation, Tokyo, Japan

[21] Appl. No.: 820,597

[22] PCT Filed: Jun. 21, 1991

[86] PCT No.: PCT/JP91/00843
§ 371 Date: Jan. 23, 1992
§ 102(e) Date: Jan. 23, 1992

[87] PCT Pub. No.: WO92/00208
PCT Pub. Date: Jan. 9, 1992

[30] Foreign Application Priority Data

Jun. 27, 1990 [JP] Japan .................................. 2-169485

[51] Int. Cl.$^5$ ............................................ B60R 21/22
[52] U.S. Cl. .................................... 280/730; 280/731; 280/732; 280/743
[58] Field of Search ................. 280/730, 731, 732, 743

[56] References Cited

U.S. PATENT DOCUMENTS

| 3,618,979 | 4/1971 | Gulette | 280/743 |
| 3,938,824 | 2/1976 | Patzelt | 280/743 |
| 4,449,728 | 5/1984 | Pilatzki | 280/743 |

FOREIGN PATENT DOCUMENTS

| 2159449 | 6/1973 | Fed. Rep. of Germany . |
| 2625184 | 12/1977 | Fed. Rep. of Germany . |
| 1431098 | of 1966 | France . |
| 51-9984 | 3/1976 | Japan . |
| 63-34751 | 3/1988 | Japan . |
| 141439 | 5/1989 | Japan . |
| 1462125 | 1/1977 | United Kingdom . |

Primary Examiner—Kenneth R. Rice
Attorney, Agent, or Firm—Kanesaka and Takeuchi

[57] ABSTRACT

An air bag which is inflated simultaneously or almost simultaneously as a whole to be above to receive a human body quite securely, which is made up on non-expandable cloth as a whole, and which has a shape at inflation wherein both side portions of a central surface facing a human body are projected forward more than the surface facing a human body is projected.

5 Claims, 3 Drawing Sheets

AIR BAG

BACKGROUND OF THE INVENTION

1. Field of the Invention

The present invention relates to an air bag which is provided on a vehicle and is inflated when the vehicle crashes against something to protect the passenger and, more particularly to an air bag whose shape at inflation has been improved.

2. Discussion of the Prior Art

As shown in FIG. 7, an air bag 21 of an air bag device is rapidly inflated when a vehicle 20 crashes against something, by gas from an inflator to protect a human body 10.

As this type of air bag, a type whose shape is an inflated state is like a flat board, is widely used. In Japanese laid open utility model publication 50-34441, an air bag 1 is disclosed, both sides of the surface thereof which faces a human body projecting forward when inflated, as shown in FIG. 3 and FIG. 4. With such an air bag 1, since the human body 10 is sandwiched from left and right sides by projecting portions 1b and 1c of the air bag which has been inflated, it is possible to securely receive the human body.

The air bag of Japanese laid open utility model publication 50-34441 has a configuration wherein the left and right sides of the surface facing a human body are made of expandable cloth and, as a result, the left and right sides of the surface facing a human body are projected forward by the pressure of gas when inflated. However, when the gas selectively flows towards one side of the air bag because of a bias current occurred in the gas flow from the inflator, for example, the expandable cloth on one side (e.g., the side of 1b) is projected primarily while the expandable cloth on the other side (the side of 1b) is not projected so much and, as a result, it is not possible to receive the human body while sandwiching it from left and right sides.

Further, at the time of inflation, the center of the expandable cloth is projected forward more than the periphery of the expandable cloth is projected. As a result, when the human body 10 in front of the projecting portion 1c (or 1b), the left and right sides of the air bag form sharp peaks as shown in FIG. 4 which may strike the human body.

SUMMARY OF THE INVENTION

An air bag according to the present invention is an air bag inflated by gas from an inflator which is characterized in that is made up on non-expandable cloth as a whole and its shape at inflation is such that both side portions are projected forward more than the central surface facing a human body is projected.

Since the air bag according to the present invention is made up of non-expandable cloth as a whole, the surface facing the human body and projecting portions on both sides thereof are inflated evenly when it is inflated. In this case, even if there is a bias current in the gas from the inflator, the projecting portions on the left and right sides are evenly inflated almost simultaneously. Further, the left and right projecting portions will have a substantially flat shape without sharp peak at the forward end thereof.

BEST MODE OF CARRYING OUT THE INVENTION

Figure 1:
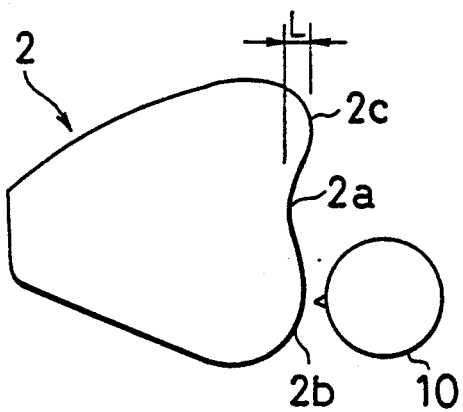
FIG. 1 is a plan view of an air bag of an embodiment of the present invention at inflation.
Figure 2:
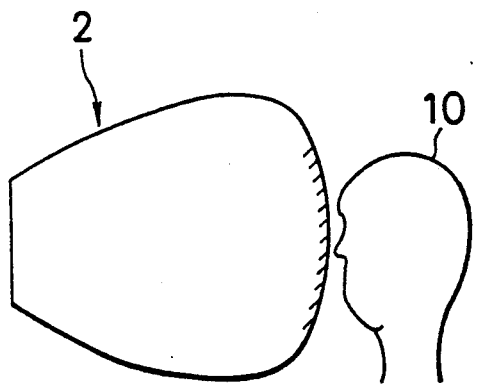
FIG. 2 is a side view of the air bag.
Figure 3:
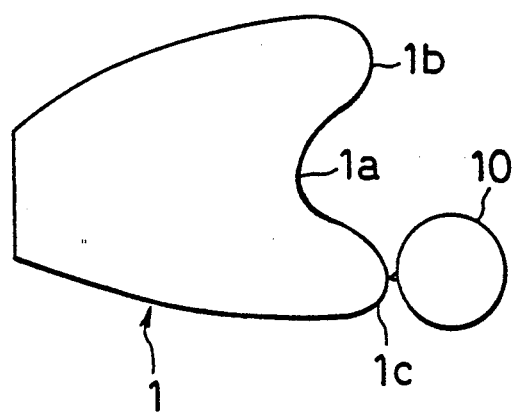
FIG. 3 is a plan view of a conventional air bag.
Figure 4:
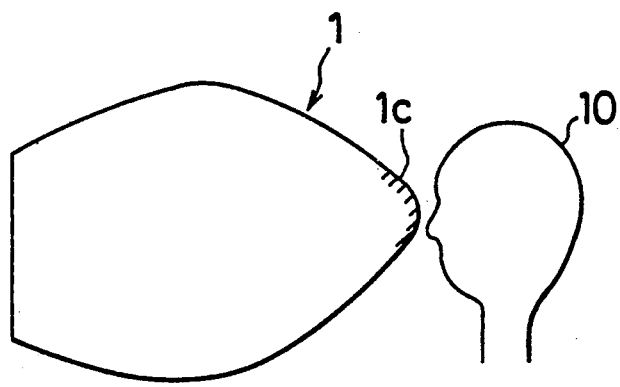
FIG. 4 is a side view of the conventional air bag.
Figure 5:
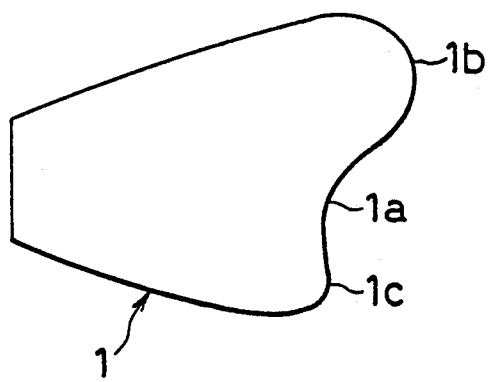
FIG. 5 is a modified plan view of a modified conventional air bag.

An embodiment of the present invention will now be described with reference to the accompanying drawings. FIG. 1 is a plan view of an air bag of an embodiment of the present invention at inflation, and FIG. 2 is a side view of the same.

An air bag 2 of the present embodiment has a shape wherein a surface 2a facing a human body has projecting portions 2b and 2c at the left and right sides thereof, and is made up on non-expandable cloth as a whole.

According to the present invention, the projecting portions 2b and 2c are preferably projected more than a recessed portion at the center of the surface 2a by 50–500 mm and most preferably by 100–200 mm. The dimension L in FIG. 1 indicates the length of the projection.

In an air bag having such a configuration, even if gas flow from an inflator is biased towards one of the left and right sides, the air bag is inflated almost simultaneously as a whole, and the left and right projecting portions 2b and 2c have the same shape. As a result, the human body 10 can be received so that it is sandwiched from left and right sides. Further, the forward ends of the projecting portions will be substantially flat and the projecting portion will not strike the human body.

The non-expandable cloth used in the present invention includes, for example, plain weave nylon cloth coated with chloroprene rubber or silicone rubber.

Figure 6:
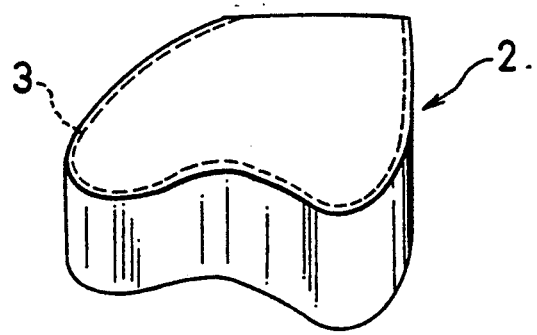
FIG. 6 is a perspective view of the air bag of the embodiment of the present invention.
Figure 7:
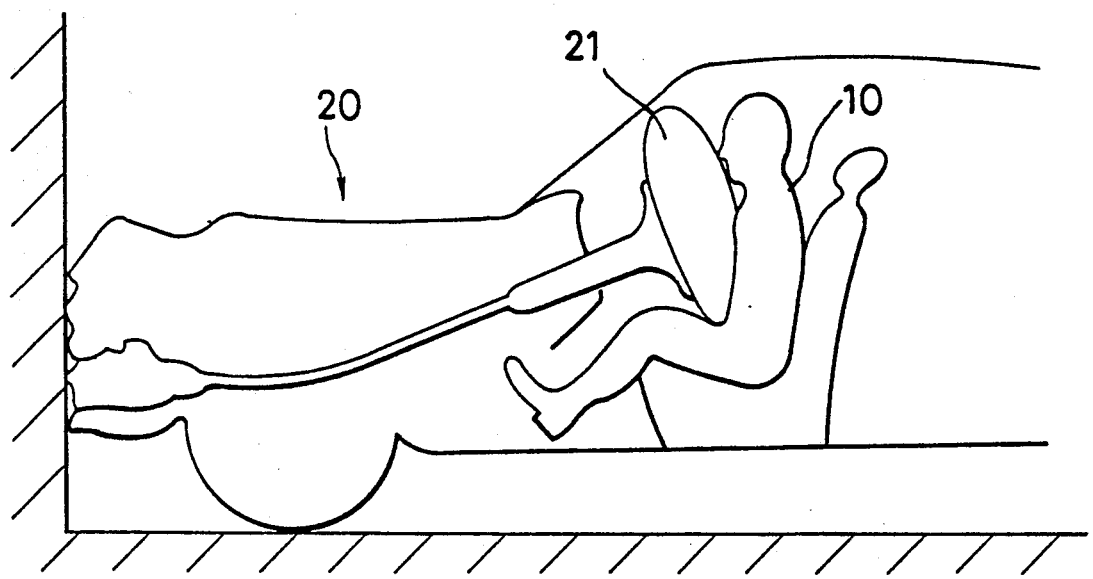
FIG. 7 is a side view showing the operation of an air bag.

FIG. 6 shows the combination of pieces of cloth in such an air bag with projecting portions. In FIG. 6, the broken line 3 represents a seam between the edges of the pieces of cloth. As shown in FIG. 6, according to the present invention, the seam 3 does not exist in the surface touching a human body, nd abrasion due to the seam 3 is thus avoided.

INDUSTRIAL APPLICABILITY

As described above, the air bag according to the present invention is inflated simultaneously or almost simultaneously as a whole and, in addition, the left and right projecting portions are projected evenly when inflated. Therefore, it is possible to receive a human body quite securely. Moreover, only one king of cloth will suffice to make the air bag, so that manufacturer thereof is made simpler.

What is claimed is:

1. An air bag for protecting a person in a vehicle comprising:

a front portion directing to a face of the person when inflated and having an edge, a center portion, and left and right portions located on both sides of the center portion, said front portion having no seam at the center portion and the left and right portions and having a shape at inflation such that the left and right portions smoothly curve and project from the center portion laterally and outwardly at a distance between 50 and 500 mm, said front portion smoothly extending vertically without forming a projection, and a side portion sewed to the edge of the front portion so that a seam between the front and side portions is located away from the face of the person when inflated, said side portion extending from a part of a vehicle toward the person when inflated, said front and side portions being formed of non-expandable cloths as a whole.

2. The air bag according to claim 1 wherein the non-expandable cloth is rubber-coated plain weave nylon cloth.

3. The air bag according to claim 2 wherein the rubber is chloroprene rubber or silicone rubber.

4. The air bag according to claim 1, wherein said front portion curves vertically to smoothly project outwardly at a center thereof when inflated.

5. The air bag according to claim 4, wherein said center portion and left and right portions have sizes about ⅓ of the front portion, respectively.

* * * * *